United States Patent [19]

Wolf

[11] 4,090,548

[45] May 23, 1978

[54] MOTORCYCLE TIRE CHANGING MACHINE

[76] Inventor: William Henry Wolf, 3436 Niagara Falls Blvd., North Tonawanda, N.Y. 14150

[21] Appl. No.: 771,028

[22] Filed: Feb. 22, 1977

[51] Int. Cl.² ............................................. B60C 25/06
[52] U.S. Cl. ................................. 157/1.17; 157/1.3; 144/288 A
[58] Field of Search .................. 144/288 A; 157/1.17, 157/1.2, 1.24, 1.3

[56] References Cited

U.S. PATENT DOCUMENTS

| 3,100,011 | 8/1963 | Lydle | 157/1.22 |
| 3,191,657 | 6/1965 | Lund | 157/1.24 |
| 3,908,728 | 9/1975 | DeMola | 157/1.3 X |
| 3,918,509 | 11/1975 | Trotter | 144/288 A X |

Primary Examiner—James L. Jones, Jr.
Assistant Examiner—James G. Smith
Attorney, Agent, or Firm—Sommer & Sommer

[57] ABSTRACT

A motorcycle tire changing machine includes a lower support section and an upper support section. The lower support section includes a stationary outer cylinder, and an inner cylinder mounted within the outer cylinder for rotation relative thereto. The inner cylinder is provided with a plurality of cam slots penetrated by tabs extending inwardly from the outer cylinder. A plurality of hook members extend upwardly from and beyond the inner cylinder. These hook members are adapted to engage a ring of the upper support section. The inner cylinder may be rotated relative to the outer cylinder to cause the hook members to move downwardly to capture the upper support section ring and to hold a tire interposed between the upper and lower support sections.

4 Claims, 7 Drawing Figures

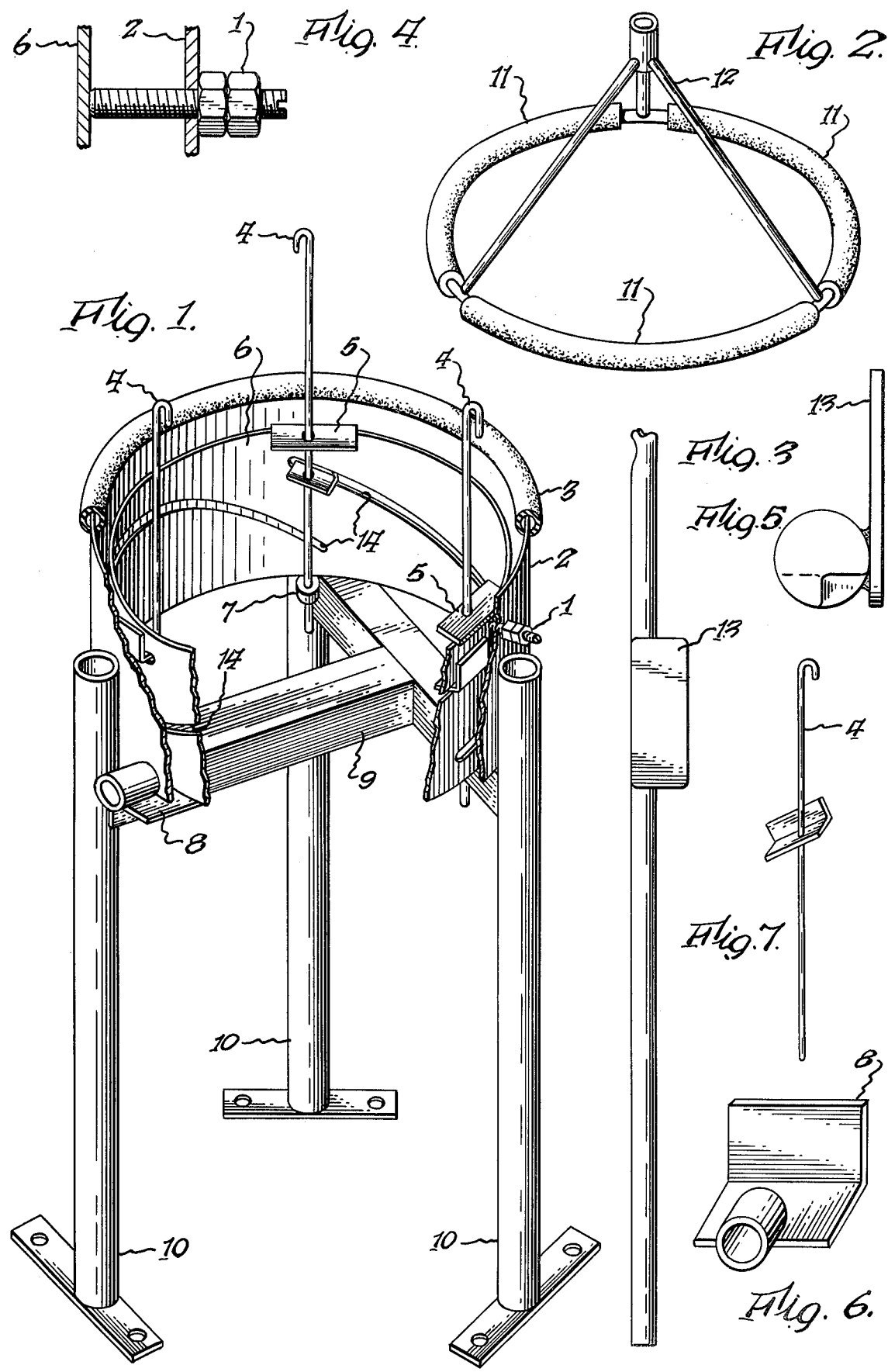

MOTORCYCLE TIRE CHANGING MACHINE

SUMMARY OF THE INVENTION

The present invention relates to improved apparatus for changing motorcycle tires.

The inventive apparatus broadly includes a lower support section and an upper support section.

The lower support section includes a stationary outer cylinder, and an inner cylinder mounted within the outer cylinder for rotation relative thereto. The inner cylinder is provided with a plurality of cam slots penetrated by tabs extending inwardly from an outer cylinder. A plurality of hook members extend upwardly from and beyond the inner cylinder. These hook members are adapted to engage a ring of the upper support section.

The inner cylinder may be rotated relative to the outer cylinder to cause the hook members to move downwardly to capture the upper support section ring and to hold a tire interposed between the upper and lower support sections.

BRIEF DESCRIPTION OF THE DRAWINGS

FIG. 1 is a perspective view of the lower support section, with a portion thereof broken away.

FIG. 2 is a perspective view of the upper support section.

FIG. 3 is an elevation of the bar tool for use with the apparatus.

FIG. 4 is an enlarged fragmentary vertical sectional view thereof, taken generally on line 4—4 of FIG. 1.

FIG. 5 is a top plan view of the bar tool shown in FIG. 3.

FIG. 6 is a perspective detail view of the means for rotating the inner cylinder relative to the outer cylinder.

FIG. 7 is a perspective detail view of a hook member and its associated tab.

DESCRIPTION OF THE PREFERRED EMBODIMENT

FIG. 1 is a cutaway perspective view of the lower support section shown in the release position. When part 8 is rotated counterclockwise, the inner cylinder part 6, to which it is attached, exerts through three inclined cam slots 14, a downward force on the hook members 4 until a holding position is reached on the upper support secton 12 or until a stop point is reached at the end of the slots 14. Relative rotation of part 8 clockwise from the holding or stop position causes hook members 4 to move upwardly. A friction drag device holds the desired position of the inner cylinder 6 relative to the outer cylinder 2 at any point within the range of relative movement. The lower end of the bar tool 13 is insertable in part 8 as a lever. Tabs 5 perform a guide and holding function and are welded to the outer cylinder. Tabs 5 are a guide to part 4 and a holder to part 6. Three of tabs 5 are required and are used for the three hook members. Part 7 provides a guide function for hook members 4 and three pieces are required. Parts 7 are welded to part 9 at the part 4 locations. Part 9 performs a holding and bracing function for parts 10, 7, 2 and is welded to the parts braced. Part 1 is a friction drag device consisting of a slotted screw which provides friction between parts 2 and 6. Part 1 has two nuts, one of which is welded to part 2 and the other of which acts as a locknut. Part 2 is a rolled steel cylinder welded to parts 5, 9, 10 and serves as a bearing surface at its top edge. At that point, part 3 is attached as a cushioning and anti-rotation medium for the wheel which is to be centered over it. Part 2 also serves as a guide for part 6, and as a mounting point for part 1 which penetrates part 2 with its screw and has its nut welded to part 2. Part 3 is a rubber hose, split and placed over the upper edge of part 2, and serves as a cushion and anti-rotation medium for the wheel that is to be placed on it when holding pressure is exerted. Part 4 serves as a holder and force link, three of parts 4 being required and located 120° apart. The "J" end of parts 4 hooks over the spoke of part 12 and provides a force link. The angle iron portion of the part is welded to the rod portion of the part at the angle required by the slot in part 6. Angle 5 fits in the slot of part 6 and provides the force link at this point. Part 4 is welded in its final position only as it cannot be preassembled and then positioned. Part 4 also serves as a centering guide for part 6. Part 6 is a rolled steel cylinder in which three inclined cam slots of equal length are located 120° apart. When rolled, these slots 14 become spiraled inclined planes. Part 8 is welded to part 6 as a tool socket. Parts 5, 7, 9, 2, 4 serve as guides and holders while part 1 is the fraction drag, and part 4 rides in the slots. Rotation of part 6 causes part 4 to move in a vertical motion relative to the direction of motion of part 6. Part 8 is an angle iron with a pipe stub welded thereto. Part 8 is welded to part 6 and serves as a tool holder for part 13, which is used to provide the leverage necessary to rotate part 6 with sufficient force to overcome the holding friction of part 1. Parts 10 consist of three leg units welded to parts 9, 2, and may be anchored to a suitable support through bolt holes to absorb tongue exerted through them.

FIG. 2 is a perspective view of the upper support section with integral tool positioner and cushioning rubber medium. Part 11 is a rubber cushioning medium which uses a split rubber hose as the medium, protects the wheel that is placed upon it. This part is placed on the outer circumference of part 12 in three pieces between the spokes. Part 12 is a welded unit consisting of a circular steel rod welded at the ends of three steel rods or spokes arrange 120° apart and having their other ends welded to a steel pipe stub at an altitude required by the inherent angles of part 13. The circular steel rod serves as a hearing surface to which parts 11 are attached. The spokes serve as the coupling point for parts 4, and the pipe stub serves as the tool leverage pont and guide for part 13.

In FIG. 3, part 13 consists of a steel bar with an end ground to specific shapes and with a flat steel guide of sufficient length to position such end on differently sized wheels as required by their tire diameters. The flat stock accomplishes its positioning function by being placed against the pipe stub of part 12. The ground end of the steel bar effects two functions: lifting the tire from the rim, and easing the tire on the rim. The grind required to ease the tire on the rim is positioned initially by the flat stock welded to the bar. The grind that guides the bar against the rim face is a 90° lip without a recurve perpendicular to the length of the bar, with the leading edge of the lip being rounded or relieved to prevent cutting the wheel rim or the tire bead. This lip occupies the lower 180° of the bar end face, as viewed from the tool end (FIG. 5). The upper 180° of the bar end face is occupied by a recurve opposite to the lip and is receded approximately 15°, as related to a perpendicular to the length of the bar. At the leading edge of the tool, this grind also begins above the point which would be indicated by the edge plane of the wheel rim surface, leaving sufficient material for the root of the lower lip grind and reaching a point equal with the wheel rim plane at two-thirds the diameter of the bar from the leading edge of the tool. All edges of the grinds must be relieved to prevent cutting of the wheel, tube or tire. The bar stock is ¾ inch diameter. The upper grind does not extend beyond the edge of the wheel rim at any point. When placed in position and being receded at the leading edge, the tire bead cannot be stretched excessively. The bead is eased to the edge, then pressed down by the recurve at the top of the grind when the tool is operated. The lower lip is held in place by the force of the tire bead that has previously slipped over the edge of the rim and has hooked itself under the rim lip. The grind used in the removal function is the reverse of the top grind, and begins behind the leading edge of the top grind at an angle away from the rim edge. This grind will appear to be an ellipse through a section with the wide section parallel to the leading edge of the tool and the narrow section being at the leading and trailing edges of the tool. The narrow section equal one-half the bar diameter and the wide section equals two-thirds the bar diameter. At the depth of the grind nearest the rim edge, it is rounded to the depth of the elliptical section and decreases in depth until full diameter is reached at a distance of ½ bar diameter away from the start of the grind away fom the leading edge. The removal grind lifts the tire bead from the rim lip and simultaneously pushes it inwardly towards the center of the wheel hub. As with the easing-on grinds, all edges must be relieved to prevent damage to the rim, tire or tube. The sections in front of the removing grind to not project more than five-eighths the diameter beyond the wheel rim edge, and therefore do not present a significant projection on which the tube could be impaled.

What is claimed is:

1. A tire changing machine, comprising:
a lower support having a base, a tire support fixed to said base, said tire support being a hollow cylinder, an inner cylinder rotatably supported within said tire support and having a plurality of downwardly inclined cam slots, bearing members secured to said base and said tire support both above and below said cam slots, hook members slidable vertically in said bearing members and fixed to brackets slidable in said cam slots, and means to rotate said inner cylinder relative to said outer cylinder; and
an upper tire support having a ring member adapted to be engaged by said hook members;
whereby a tire may be held between said upper and lower tire supports by movement of said brackets in said cam slots to cause downward movement of said hook members and engaged upper tire support.

2. A tire changing machine as set forth in claim 1 and further including a cushion member secured to the upper rim of said lower tire support, and including a cushion member secured to the ring member of said upper tire support.

3. A tire changing machine as set forth in claim 1 and further including friction means secured to the outer periphery of said tire support, said friction means comprising a nut secured to said tire support and a member matingly engaging said nut and having one end in frictional engagement with the peripheral surface of said inner cylinder to hold the inner cylinder in a desired position relative to said tire support.

4. A tire changing machine as set forth in claim 1 wherein said means to rotate said inner cylinder comprises an L-shaped bracket having one leg extending beyond the outer periphery of said tire support and having a hollow cylinder attached thereto, said hollow cylinder being adapted to receive insertion of an arm to provide leverage in moving said inner cylinder.

* * * * *